(12) United States Patent
Khan et al.

(10) Patent No.: US 9,699,248 B2
(45) Date of Patent: *Jul. 4, 2017

(54) DESKTOP SCREEN SHARING OVER HTTP

(71) Applicant: Microsoft Technology Licensing, LLC, Redmond, WA (US)

(72) Inventors: Nayab Khan, Kenmore, WA (US); Meng Lin, Issaquah, WA (US); Toji T. Oommen, Sammamish, WA (US); Jaydeep Singh, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,791

(22) Filed: Aug. 25, 2015

(65) Prior Publication Data

US 2015/0365468 A1    Dec. 17, 2015

Related U.S. Application Data

(63) Continuation of application No. 12/773,021, filed on May 4, 2010, now Pat. No. 9,143,570.

(51) Int. Cl.
*G06F 15/173* (2006.01)
*H04L 29/08* (2006.01)
*H04L 29/06* (2006.01)

(52) U.S. Cl.
CPC .............. *H04L 67/08* (2013.01); *H04L 67/02* (2013.01); *H04L 67/04* (2013.01); *H04L 67/141* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 6,782,542 B1 | 8/2004 | Mein et al. |
| 7,293,243 B1 | 11/2007 | Ben-Shachar et al. |
| 7,451,181 B2 | 11/2008 | Matsukura et al. |
| 7,595,798 B2 | 9/2009 | Ben-Shachar et al. |
| 2003/0085923 A1 | 5/2003 | Chen et al. |
| 2004/0017939 A1 | 1/2004 | Mehrotra |
| 2005/0008000 A1 | 1/2005 | Korycki et al. |
| 2005/0091571 A1 | 4/2005 | Leichtling |

(Continued)

OTHER PUBLICATIONS

"Application Sharing.", Retrieved from <<https://en.wikipedia.org/wiki/Application_sharing>>, Retrieved on: Jul. 28, 2014, 2 Pages.

(Continued)

*Primary Examiner* — Scott B Christensen
(74) *Attorney, Agent, or Firm* — Fiala & Weaver P.L.L.C.

(57) ABSTRACT

Sharing a desktop screen is implemented on a Hypertext Transfer Protocol (HTTP) web server using variable interval GET and POST requests. Connection to a web server bypasses firewall or shared IP limitations. In the described HTTP/HTTPS only solution, an existing web server is used to allow one or more clients to view a remote computer's screen and control it (remoting). The web server can act as an intermediary to enable one computer to "take control" of a second computer by enabling the first computer (a client) to view the desktop session of the second computer (a host) and enable the first computer to act as master for input device input (e.g., keyboard input, mouse input, stylus input, etc.) for the second computer.

20 Claims, 3 Drawing Sheets

(56) References Cited

U.S. PATENT DOCUMENTS

| | | |
|---|---|---|
| 2006/0136828 A1 | 6/2006 | Asano |
| 2006/0170763 A1 | 8/2006 | Kawamura et al. |
| 2006/0195495 A1 | 8/2006 | Asano |
| 2008/0095151 A1 | 4/2008 | Kawazoe et al. |
| 2008/0313545 A1 | 12/2008 | Patel et al. |
| 2009/0164645 A1 | 6/2009 | Sylvain |
| 2009/0172512 A1 | 7/2009 | Sakaguchi et al. |
| 2011/0276900 A1 | 11/2011 | Khan et al. |

OTHER PUBLICATIONS

"Inter-Tel Web Conferencing and Remote Support User Guide", Retrieved from <<http://web.archive.org/web/20061015024547/http://www.linktivity.com/pdfs/Web%20Conferencing%20%20Remote%20Support%204.5%20User%20Guide2.pdf>>, Retrieved on: Jun. 2006, 88 Pages.

"Mac Server Series: Connect With Screen Sharing", Retrieved from <<http://www.farawaymac.com/mac-server/mac-server-series-connect-with-screen-sharing/>>, Retrieved on : Mar. 3, 2010, 4 Pages.

"ScreenStream Screen Broadcasting Software", Retrieved from <<http://www.nchsoftware.com/screen/index.html>>, Retrieved on: Mar. 4, 2010, 1 Page.

"Xuggle Screensharing Notes", Retrieved from <<https://web.archive.org/web/20100313144544/http://wiki.xuggle.com/Xuggle_Screensharing_Notes>>, Retrieved on: Mar. 13, 2010, 3 Pages.

"Final Office Action issued in U.S. Appl. No. 12/773,021", Mailed Date: Jan. 22, 2013, 17 Pages.

"Non Final Office Action issued in U.S. Appl. No. 12/773,021", Mailed Date: Aug. 2, 2012, 16 Pages.

"Non Final Office Action issued in U.S. Appl. No. 12/773,021", Mailed Date: Jan. 27, 2015, 18 Pages.

"Non Final Office Action issued in U.S. Appl. No. 12/773,021", Mailed Date: Jul. 31, 2014, 18 Pages.

"Notice of Allowance issued in U.S. Appl. No. 12/773,021", Mailed Date: May 18, 2015, 8 Pages.

Boyaci, et al, "BASS Application Sharing System", In Proceedings of the 2008 Tenth IEEE International Symposium on Multimedia, ISM, Retrieved on: Dec. 15, 2008, 8 Pages.

Humphrey, Randy, "NetMeeting 3.01 Remote Desktop Sharing: Security Concerns", Retrieved from <<https://www.sans.org/reading-room/whitepapers/windows/netmeeting-301-remote-desktop-sharing-security-concerns-1119>>, May 20, 2003, 17 Pages.

Ichimura, et al, "Lightweight Desktop-Sharing System for Web Browsers", In Third International Conference on Information Technology and Applications (ICITA'05), vol. 2, Jul. 4, 2005, 6 Pages.

Wolf, et al, "Multimedia Application Sharing in a Heterogeneous Environment", In International Multimedia Conference, In Proceedings of the third ACM international conference on Multimedia, Nov. 5, 1995, 17 Pages.

DESKTOP SCREEN SHARING OVER HTTP

CROSS-REFERENCE TO RELATED APPLICATIONS

This application is a continuation of U.S. patent application Ser. No. 12/773,021, filed May 4, 2010, the entirety of which is incorporated by reference herein.

BACKGROUND

Remote desktop sharing allows a user to access applications and data on a remote computer over a network. For example, Microsoft® Remote Desktop is a model where one computer "takes control" of a second computer by viewing its desktop session and acting as master for keyboard and mouse input.

For security reasons, most users who access an external network like the Internet do so from behind one or more firewalls. A firewall is a device or set of devices configured to permit or deny access of computer applications to the firewall-protected computer based upon a set of rules and other criteria. A firewall can be implemented in either hardware or software, or in a combination of hardware and software. Firewalls are frequently used, for example, to prevent unauthorized Internet users from tunneling in to private computers and computer networks connected to the Internet. All messages entering the firewall-protected computer pass through the firewall, which examines each message and blocks those that do not meet the specified security criteria.

In order to bypass the firewall to enable remote desktop sharing, currently a user has to take a deliberate action to open a channel through a well known protocol like hypertext transfer protocol (HTTP) to a central location. The centralized location needs specialized software or hardware or a combination thereof in order to act as an intermediary for requests from the user. That is, the centralized location has to be a proxy server. The user connects to the proxy server, and requests a service, such as remote desktop sharing, from a different computer. The proxy server evaluates the request according to its filtering rules (e.g., by IP (Internet protocol) address or protocol). If the request is validated by the filter, the proxy server provides the service by connecting to the relevant computer and requesting the service on behalf of the user. A proxy server that passes requests and replies unmodified is usually called a gateway or a tunneling proxy.

SUMMARY

Readily available web servers that do not have any specialized hardware or software (such as the specialized hardware/software that proxy servers and gateways have) are used to enable sharing of remote desktop screens between two computers for remote control. Computer desktop screens are shared over a non-secure or secure HTTP connection via a web server using variable or constant interval GET and POST requests. Current remote technologies use specialized hardware and/or software known as proxy servers or gateways to bypass firewall or shared IP limitations. In contrast, as described herein, an ordinary web server is used. The web server lacks software and lacks hardware that bypasses firewall or shared IP limitations.

In the described HTTP solution, an existing web server is used to allow one or more clients to view a remote computer's screen and control it (remoting). Unlike other methods employed today, no specialized servers are used to share a remote desktop application. The web server can act as an intermediary to enable one computer to "take control" of a second computer by enabling the first computer (a client) to view the desktop session of the second computer (a host) and enable the first computer to act as master for input device input (e.g., keyboard input, mouse input, stylus input, etc.) for the second computer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Desktop Screen Sharing Over HTTP

Figure 1:
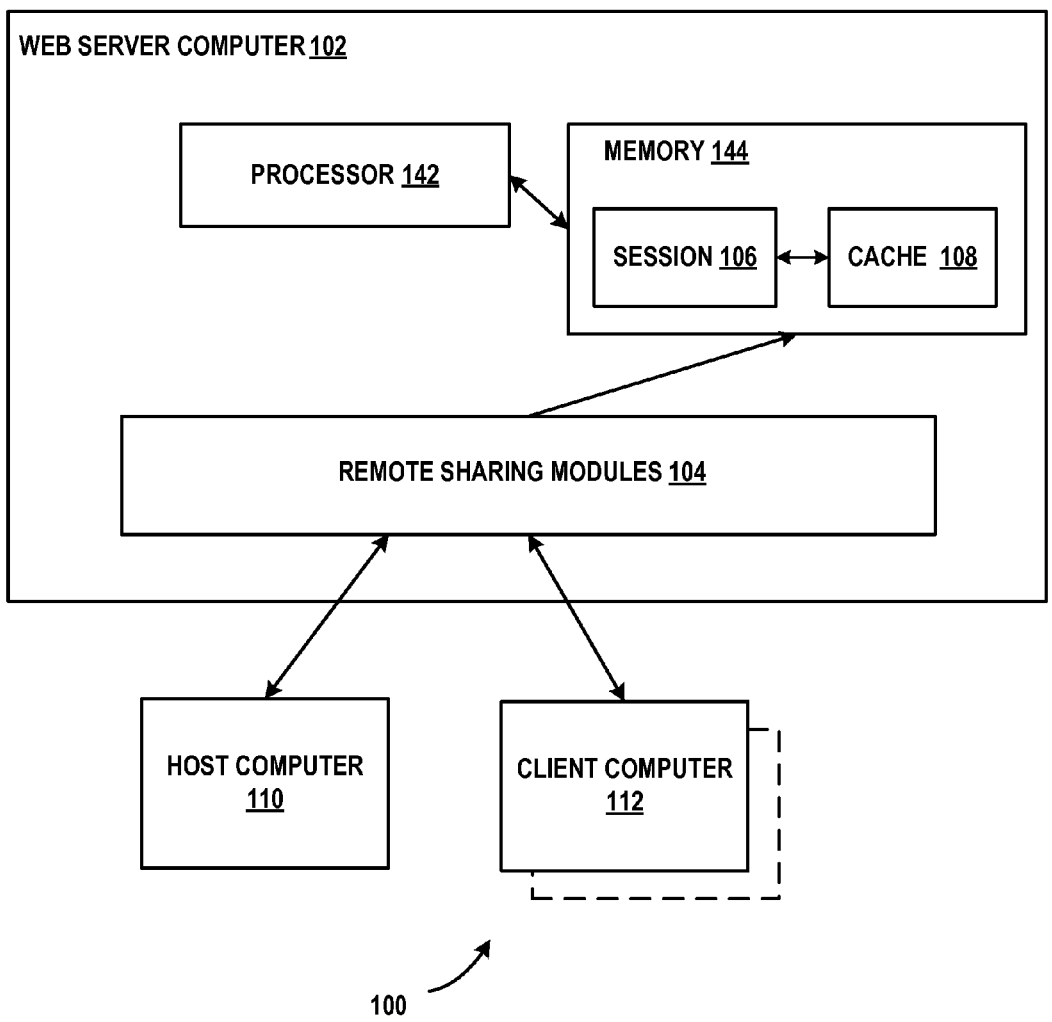
FIG. 1 illustrates an example of a system 100 that implements desktop screen sharing over HTTP in accordance with aspects of the subject matter disclosed herein.

FIG. 1 illustrates an example of a system 100 for desktop screen sharing over HTTP in accordance with aspects of the subject matter disclosed herein. All or portions of system 100 may reside on one or more computers such as the computers described below with respect to FIG. 3. System 100 or portions thereof may be provided as a stand-alone system or as a plug-in or add-in.

The computer on which system 100 executes is a web server computer (e.g., web server 102). The web server 102 is not a proxy server. The web server 102 is not a gateway. The web server 102 lacks software and lacks hardware that bypasses firewall or shared IP limitations. Web server 102 may act as an intermediary to enable one computer to "take control" of a second computer by enabling the first computer (a client) to view the desktop session of the second computer (a host) and enable the first computer to act as master for input device input (e.g., keyboard input, mouse input, stylus input, etc.) for the second computer. Web server 102 may include one or more of: a processor (such as processor 142), a memory 144, and one or more modules for desktop screen sharing over HTTP or HTTPS. Hypertext Transfer Protocol Secure (HTTPS) refers to a combination of the Hypertext Transfer Protocol with the SSL/TLS protocol to provide encryption and secure (website security testing) identification of the server. Hence a communication over HTTP is called a non-secure communication and a communication over HTTPS is called a secure communication. Other components well known in the arts may also be included but are not here shown. It will be appreciated that one or more modules for desktop screen sharing over HTTP/HTTPS can be loaded into memory 144 to cause one or more processors such as processor 142 to perform the actions attributed to one or more modules for desktop screen sharing over HTTP/HTTPS. System 100 can also include one or more of the following: one or more modules for remote desktop sharing 104, a session 106 and a cache 108. It will be appreciated that whenever the term "HTTP" is used herein, "HTTPS" is included within the scope of the subject matter disclosed. That is, the term "HTTP" as used herein is equivalent to "HTTP/HTTPS" or "HTTP and/or HTTPS".

In accordance with aspects of the subject matter disclosed herein, the host computer 110 can connect to a web server 102 and request the web server to create a new session such as session 106 via a HTTP GET command. Web server 102 can receive the communication from the host computer 110 and in response can establish the requested session and can return a session-specific identifier for the session to the host computer 110 via a HTTP POST or HTTP GET command. As web server 102 may have sessions for a number of different users, a session-specific identifier can provide a mechanism to identify the session for this particular host (and any clients that may join the session). The host computer 110 can use a codec such as but not limited to a screen codec such as Microsoft® Titanium Codec, an audio codec such as Direct Stream Digital, Free Lossless Audio Codec, etc., a text codec such as BiM, Continuous Media Markup Language, etc., a video codec such as Alpary or Blackbird, or any lossy or lossless codec, whether now known or developed in the future. In accordance with aspects of the subject matter disclosed herein, the codec can be used to send encoded screen images and encoded screen image updates to web server 102.

A codec is a device or computer program capable of encoding and/or decoding a digital data stream or signal or other data stream or signal. A codec encodes a data stream or signal for transmission, storage or encryption, or decodes it for playback or editing. Codecs can be used in videoconferencing and streaming media applications. For example, a video camera's analog-to-digital converter (ADC) can convert an analog camera's analog signals into digital signals. The digital signals can then be passed through a video compressor for digital transmission or storage. A receiving device can run the signal through a video decompressor and then through a digital-to-analog converter (DAC) for analog display. The term codec is also used as a generic name for a video conferencing unit.

In accordance with aspects of the subject matter disclosed herein, the host computer 110 can use the codec to post an initial encoded screen image and/or differential encoded screen image updates to web server 102 using an HTTP POST or HTTP GET command. Posting of the images can occur at regular (constant) intervals or at variable intervals. Each screen image update can be time stamped for replay in time sequence on the client computer 112. Web server 102 can cache screen image and screen image updates in memory as a first-in-first-out (FIFO) list (e.g., in cache 108). In the request, web server 102 can instruct the host computer to change its screen image update intervals or screen resolution. One or more clients computers such as client computer 112, etc. can connect to web server 102 and request to join the session 106 identified by the session-specific identifier using an HTTP POST or GET command. The client computer 112 can specify the session-specific identifier of the session 106 or session management software as known in the art on web server 102 can manage the session initiation between the host computer 110 and the client computer 112. The client computer 112 can request the initial encoded screen image and the encoded differential screen image updates from web server 102 for the session 106 identified by the session-specific identifier ID using an HTTP GET command. The client computer 112 can also send any user device input events that originated at the client computer 112 to the web server 102 using an HTTP POST command.

Web server 102 can keep track of the screen images and screen image updates that were transferred from web server 102 to the client computer 112 and can send only updated screen image data to the client computer 112 in response to an HTTP POST command. The screen image data sent to the client computer 112 can optionally be sent from storage in the FIFO list cache 108. Web server 102 can send all the updated screen image data as one package or can send the updated screen image data in multiple packages. The screens can be sent as a JSON object or in any other way. The client computer 112 can process the screen updates received from the web server 102. The described process can be continued until the session 106 is closed. The described process can be used to allow the client computer 112 to take control of the host computer 110 and to enable the client computer 112 to act as the master of host computer 110 for keyboard and mouse input. The session 106 can be closed by the host computer 110 or by the client computer 112 or by the web server 102.

Both the host computer 110 and the client computer 112 can use Javascript as the browser language. Javascript uses Asynchronous JavaScript And XML (AJAX) (XmlHttpRequest) calls to transfer data. Alternatively, other browser languages can be used. An add-in can also or alternatively communicate with the web server 102 directly using HTTP GET/POST.

The interval of posting screen updates can be varied by the web server 102 depending on the number of screen update packets in the FIFO list waiting to be sent to the client computer 112. For example, a client computer that is slower that the host computer may cause the FIFO list in cache 108 to become large. In response web server 102 can tell host computer 110 to slow down its update interval (e.g., increase the time interval between updates). Similarly, if the FIFO list in cache 108 becomes very small, either in size or in number of updates, the web server may tell the host computer 110 to increase the speed of the update interval (i.e., decrease the update interval so that more updates are made within a given time period). A formula that determines update interval can be a linear equation where the length of interval is directly proportional to the size or number of pending items in FIFO list.

Alternatively, a persistent web connection from the host computer 110 and the client computer 112 through the web server 102 can be enabled. No polling is involved in these circumstances.

Figure 2:
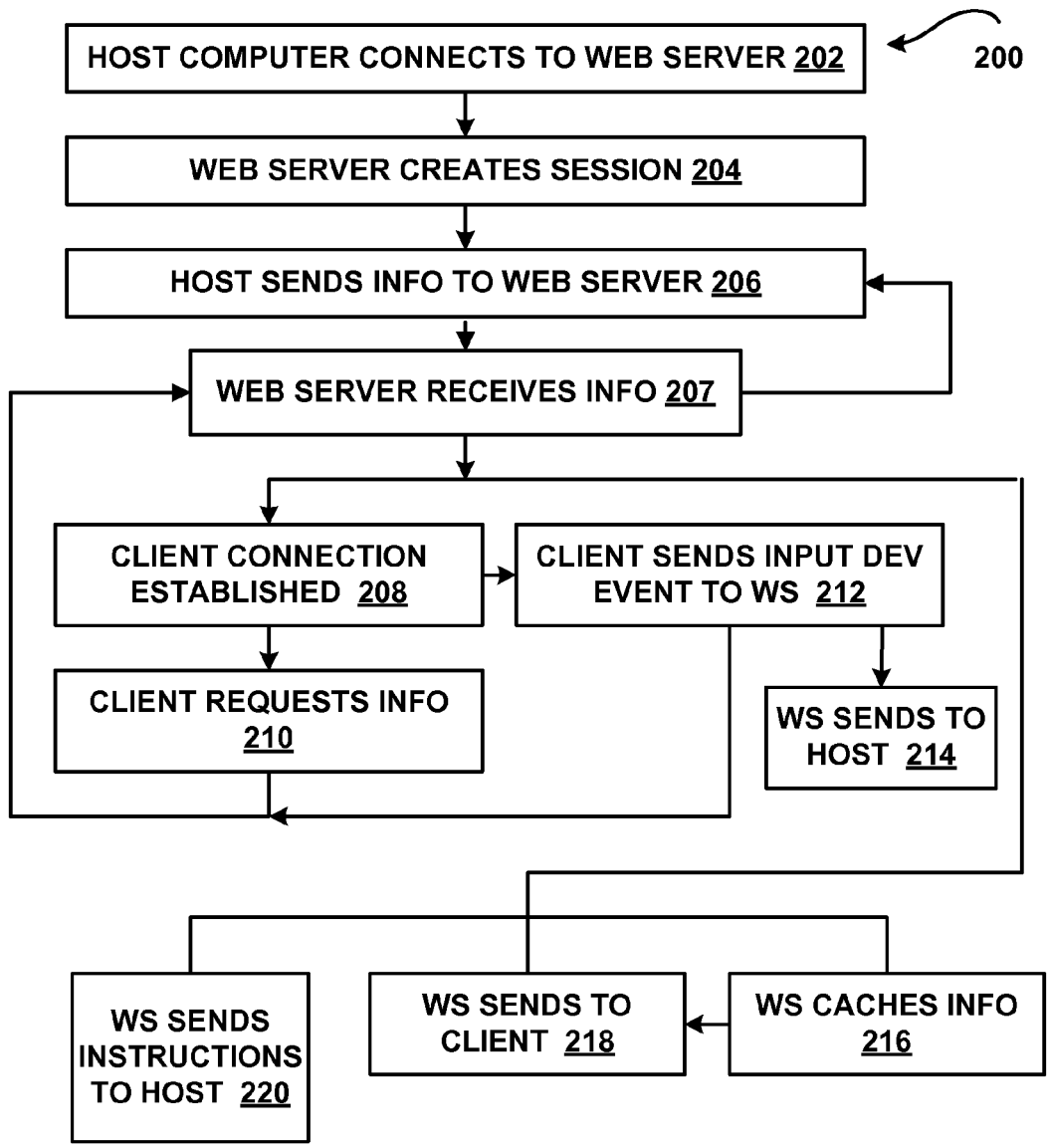
FIG. 2 is a flow diagram of an example of a method 200 for desktop screen sharing over HTTP in accordance with aspects of the subject matter disclosed herein.

FIG. 2 is an example of a method 200 for sharing a desktop screen over HTTP. Some of the actions described below may be optional or may occur in a different sequence than described. Method 200 or portions thereof may be performed by system 100 as described above. At 202 a host computer can connect to a web server and request a session using an HTTP GET command. The web server can be a web server such as the one described above with respect to FIG. 1. The web server can receive the connection request from the host computer. At 204 the web server may create a session for the host computer. The web server may assign a session-specific identifier to the session and send the host computer the assigned session-specific identifier using an HTTP POST command.

The following actions can occur in various sequences. At 206 the session established, the host computer can post an initial screen or update information (e.g., screen image update) for sharing over HTTP using an HTTP GET or POST command. The web server can receive the information at 207. In addition to receiving information from the host computer, the web server can receive information from any client computers that have joined the session, as described more fully below. At 208 the web server can receive a connection request via an HTTP GET or POST command from the client computer and the client computer can connect to the session identified by the session-specific identifier on the web server. The client computer can be informed of the session-specific identifier for the session either by the host computer or by session management software known in the art. After the client computer joins the session, at 210 the client computer can request information received by the web server from the host computer using an HTTP GET or POST command and the web server can receive the information request.

At 212 the client computer can send input event information from the client computer to the web server using an HTTP POST or GET command. At 214 the web server can send the input event information from the client computer to the host computer using an HTTP POST command. At 216 the web server can optionally cache the information received via an HTTP POST command from the host computer. At 218 the web server can send information received from the host computer to the client computer in response to an HTTP POST command. At 220 the web server can send instructions to the host computer to adjust its screen image update interval. These actions can continue until the session is ended by the client or by the host computer or by the web server.

Example of a Suitable Computing Environment

Figure 3:
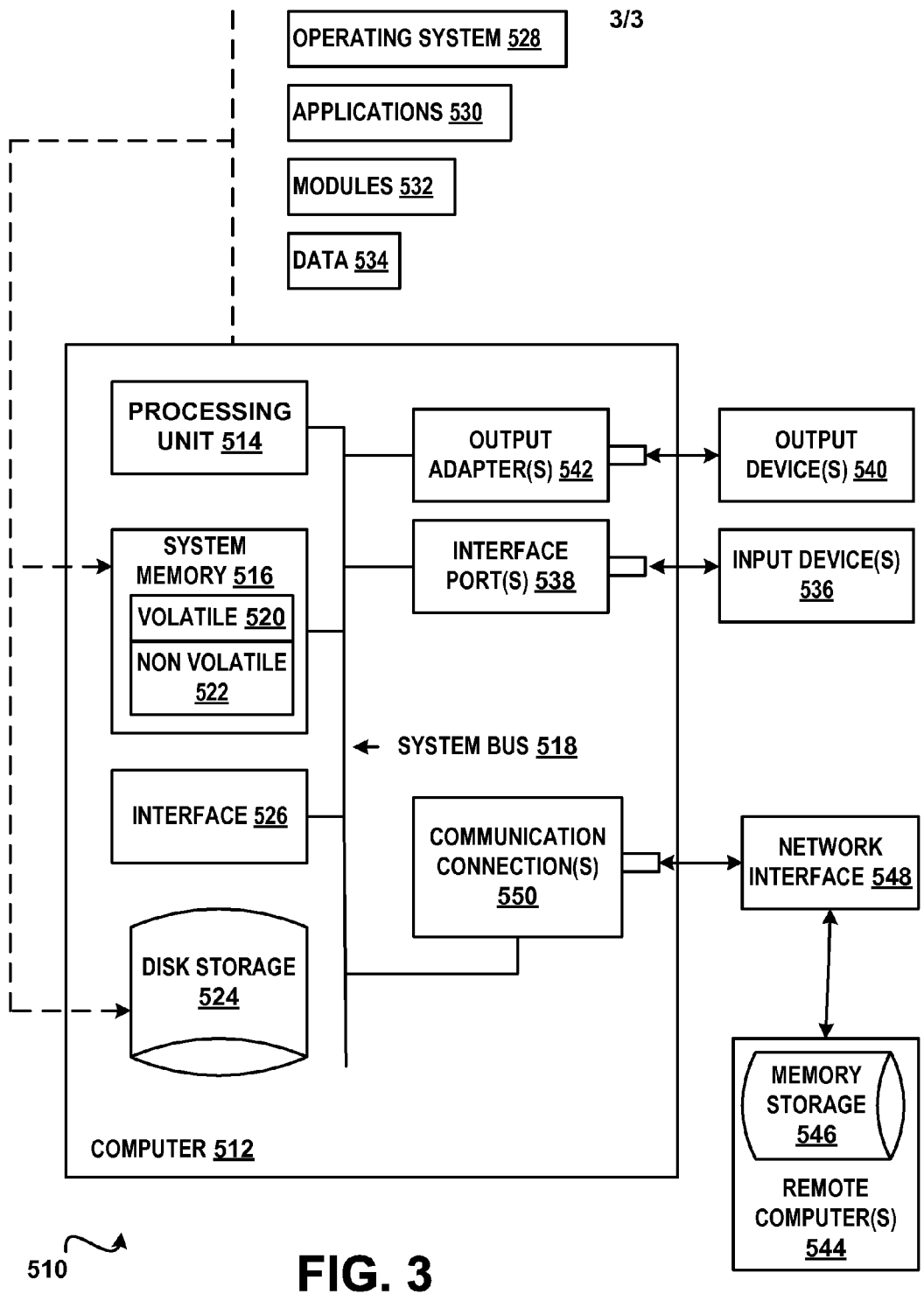
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for efficient resumption of co-routines on a linear stack in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
a web server, wherein the web server is not a proxy server;
the web server comprising a processor and a memory; and
a module on the web server configured to cause the processor to:
receive a communication comprising a first HTTP command from a host computer requesting a session on the web server;
in response to receiving the communication, establish the session on the web server and assign a session-specific identifier to the session;
receive a second HTTP command from the host computer to receive an encoded screen image from the host computer using a codec;
receive a communication comprising a third HTTP command from a client computer requesting to join the session on the web server;
send to the client computer the encoded screen image via a fourth HTTP command;
receive a device input event originating at the client computer via a fifth HTTP command; and
send to the host computer the device input event via a sixth HTTP command, the device input event being processed at the host computer to enable the client to act as master for input device input of the host computer.

2. The system of claim 1, wherein the web server lacks software that bypasses a firewall and lacks hardware that bypasses a firewall.

3. The system of claim 1, wherein the web server instructs the host computer to change an update interval of sending encoded screen images in a seventh HTTP command.

4. The system of claim 1, wherein the web server keeps track of the encoded screen images transferred from the web server to the client computer and sends only updated screen data to the client computer.

5. The system of claim 1, wherein differential encoded screen images are posted to the web server at variable intervals.

6. The system of claim 5, wherein the differential encoded screen images are stored in a FIFO cache at the web server.

7. The system of claim 1, wherein the client computer takes control of the host computer and acts as master of the host computer for input device input.

8. A method comprising:
receiving a communication on a web server from a host computer, the communication comprising a first HTTP command, the host computer requesting a session on the web server, wherein the web server is not a proxy server;
in response to receiving the communication, establishing the session on the web server;
sending from the web server to the host computer, a session-specific identifier identifying the established session via a second HTTP command;
receiving at the web server a third HTTP command from the host computer, the third HTTP command comprising an encoded screen image;
receiving at the web server a communication comprising a fourth HTTP command from a client computer requesting to join the session identified by the session-specific identifier;
sending the encoded screen image from the web server to the client computer;
receiving at the web server a device input event originating at the client computer via a fifth HTTP command; and
sending the device input event via a sixth HTTP command from the web server to the host computer, such that the client computer acts as master for the host computer's input device input.

9. The method of claim 8, further comprising:
instructing the host computer to change an update interval for screen image updates.

10. The method of claim 9, further comprising:
tracking screen image updates transferred from the web server to the client computer and sending only updated screen data to the client computer.

11. The method of claim 8, further comprising receiving differential encoded screen image updates at the web server at variable intervals.

12. The method of claim 8, further comprising:
receiving at the web server a request for screen image data from the client computer, the request comprising a seventh HTTP command.

13. The method of claim 8, further comprising:
storing the third HTTP command comprising the encoded screen image in a FIFO cache on the web server.

14. The method of claim 13, further comprising:
sending the stored encoded screen image from the FIFO cache to the client computer.

15. A computer-readable storage device comprising computer-executable instructions which when executed cause at least one processor to:
receive a communication comprising a first HTTP command from a host computer requesting a session on a web server;
in response to receiving the communication, establish the session on the web server and assign a session-specific identifier to the session;
receive at least one second HTTP command of a plurality of HTTP commands from the host computer, the at least one second HTTP command comprising an encoded screen image;
store the encoded screen image of the at least one second HTTP command in a cache on the web server;
receive a communication comprising a third HTTP command from a client computer requesting to join the session on the web server;
send to the client computer screen image data stored in the cache via a fourth HTTP command.

16. The computer-readable storage device of claim 15, comprising further computer-executable instructions, which when executed cause the at least one processor to:
control an update interval for screen image updates on the host computer via a fifth HTTP command sent from the web server to the host computer.

17. The computer-readable storage device of claim 15, comprising further computer-executable instructions, which when executed cause the at least one processor to:
send the client computer data stored in the cache in a plurality of packages, wherein each package is sent via a fifth HTTP command.

18. The computer-readable storage device of claim 15, comprising further computer-executable instructions, which when executed cause the at least one processor to:
transfer only updated screen data from the web server to the client computer.

19. The computer-readable storage device of claim 15, comprising further computer-executable instructions, which when executed cause the at least one processor to:
receive input device events originating at the client computer via fifth HTTP commands; and
send the input device events via sixth HTTP commands, wherein the device input events are sent to the host computer, such that the client computer controls the host computer and acts as master of the host computer for input device input.

20. The computer-readable storage device of claim 19, comprising further computer-executable instructions, which when executed cause the at least one processor to:
send input device events controlling the host computer without the web server having software that bypasses a firewall and without the web server having hardware that bypasses a firewall.

* * * * *